United States Patent
Lau et al.

(10) Patent No.: US 12,481,803 B2
(45) Date of Patent: Nov. 25, 2025

(54) GENETIC OPTIMIZATION TECHNIQUES FOR DESIGNING MANUFACTURING FACILITIES

(71) Applicant: AUTODESK, INC., San Francisco, CA (US)

(72) Inventors: Damon Lau, New York, NY (US);
David Benjamin, Brooklyn, NY (US);
James Stoddart, Atlanta, GA (US);
Lorenzo Villaggi, Brooklyn, NY (US);
Dale Zhao, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 814 days.

(21) Appl. No.: 17/220,803

(22) Filed: Apr. 1, 2021

(65) Prior Publication Data

US 2022/0318445 A1    Oct. 6, 2022

(51) Int. Cl.
*G06F 30/17*  (2020.01)
*G06F 30/13*  (2020.01)
*G06F 30/20*  (2020.01)
*G06F 119/12* (2020.01)

(52) U.S. Cl.
CPC .............. *G06F 30/17* (2020.01); *G06F 30/13* (2020.01); *G06F 30/20* (2020.01); *G06F 2119/12* (2020.01)

(58) Field of Classification Search
CPC .......... G06F 30/17; G06F 30/20; G06F 30/13; G06F 2119/12
See application file for complete search history.

(56) References Cited

FOREIGN PATENT DOCUMENTS

CN      108959782 A      12/2018

OTHER PUBLICATIONS

Saez-Mas A, Garcia-Sabater JJ, Garcia-Sabater JP, Maheut J. Hybrid approach of discrete event simulation integrated with location search algorithm in a cells assignment problem: a case study. Central European Journal of Operations Research. Mar. 2020;28(1):125-42. (Year: 2018).*

Nagy D, Lau D, Locke J, Stoddart J, Villaggi L, Wang R, Zhao D, Benjamin D. Project discover: An application of generative design for architectural space planning. InProceedings of the Symposium on Simulation for Architecture and Urban Design May 22, 2017 (pp. 1-8). (Year: 2017).*

(Continued)

*Primary Examiner* — Chuen-Meei Gan
(74) *Attorney, Agent, or Firm* — Artegis Law Group, LLP

(57) ABSTRACT

Techniques are disclosed for designing manufacturing facilities. A design application imports a computer-aided design (CAD) model and metadata associated with a manufacturing facility to generate a data set that specifies geometric and manufacturing constraints of the manufacturing facility. The design application performs optimization operations based on the data set to identify one or more high-performing designs that assign components to docks in the manufacturing facility. The optimization operations can include genetic optimization operations that generate multiple generations of designs, each of which is evaluated based on a travel distance, congestion, and number of turns associated with paths traversed by components for the design.

18 Claims, 10 Drawing Sheets

(56) References Cited

OTHER PUBLICATIONS

Hasda RK, Bhattacharjya RK, Bennis F. Modified genetic algorithms for solving facility layout problems. International Journal on Interactive Design and Manufacturing (IJIDeM). Aug. 2017;11:713-25. (Year: 2017).*

Zhang M, Batta R, Nagi R. Modeling of workflow congestion and optimization of flow routing in a manufacturing/warehouse facility. Management Science. Feb. 2009;55(2):267-80. (Year: 2009).*

Osman HM, Georgy ME, Ibrahim ME. A hybrid CAD-based construction site layout planning system using genetic algorithms. Automation in construction. Nov. 1, 2003;12(6):749-64. (Year: 2003).*

Extended European Search Report for Application No. 22165090.6 dated Sep. 12, 2022.

Saez-Mas et al., "Hybrid approach of discrete event simulation integrated with location search algorithm in a cells assignment problem: a case study", CEJOR, vol. 28, No. 1, DOI: 10.1007/S10100-018-0548-5, May 17, 2018, pp. 125-142.

Drira et al., "Facility layout problems: A survey", Annual Reviews in Control, vol. 31, No. 2, Nov. 5, 2007, pp. 255-267.

Burggraf et al., "Bibliometric Study on the Use of Machine Learning as Resolution Technique for Facility Layout Problems", IEEE Access, vol. 9, DOI: 10.1109/ACCESS.2021.3054563, Jan. 25, 2021, pp. 22569-22586.

Onut et al., "A particle swarm optimization algorithm for the multiple-level warehouse layout design problem", Computers & Industrial Engineering, vol. 54, No. 4, DOI:10.1016/J.CIE.2007.10.012, 2008, pp. 783-799.

Non Final Office Action received for U.S. Appl. No. 17/220,808 dated Jan. 22, 2024, 33 pages.

Sellen, Jurgen, "Direction Weighted Shortest Path Planning", In Proceedings of IEEE International Conference on Robotics and Automation, vol. 2, 1995, pp. 1970-1975.

Osman et al., "A Hybrid CAD-based Construction Site Layout Planning System using Genetic Algorithms", Automation in construction, vol. 12, No. 6, Jun. 26, 2003, pp. 749-764.

Gopakumar et al., "A Simulation Based Approach for Dock Allocation in a Food Distribution Center", Proceedings of the Winter Simulation Conference, 2008, pp. 2750-2755.

Amadori et al., "Flexible and Robust CAD Models for Design Automation", Advanced Engineering Informatics, doi: 10.1016fj.aei.2012.01.004, vol. 26, Jan. 18, 2012, pp. 180-195.

Non Final Office Action received for U.S. Appl. No. 17/220,813 dated Feb. 29, 2024, 26 pages.

Imran et al., "Cell Formation in a Cellular Manufacturing System Using Simulation Integrated Hybrid Genetic Algorithm", Computers & Industrial Engineering, vol. 105, Mar. 1, 2017, pp. 123-135.

Final Office Action received for U.S. Appl. No. 17/220,808 dated May 8, 2024, 43 pages.

Besbes et al., "A Methodology for Solving Facility Layout Problem Considering Barriers: Genetic Algorithm Coupled With A* Search", Journal of Intelligent Manufacturing, https://doi.orgl10.1007 Is1 0845-019-01468-x, vol. 31, 2020, pp. 615-640.

Non Final Office Action received for U.S. Appl. No. 17/220,808 dated Oct. 11, 2024, 42 pages.

Final Office Action received for U.S. Appl. No. 17/220,813 dated Jul. 5, 2024, 40 pages.

Non Final Office Action received for U.S. Appl. No. 17/220,813 dated Feb. 13, 2025, 27 pages.

Final Office Action received for U.S. Appl. No. 17/220,808 dated Feb. 20, 2025, 43 pages.

Guo et al., "A Genetic-Algorithm-Based Optimization Model for Solving the Flexible Assembly Line Balancing Problem with Work Sharing and Workstation Revisiting", IEEE Transactions on Systems, Man, and Cybernetics, Part C: Applications and Reviews, vol. 38, No. 2, Mar. 2008, pp. 218-228.

Leu et al., "Assembly Line Balancing Using Genetic Algorithms with Heuristic-Generated Initial Populations and Multiple Evaluation Criteria", Decision Sciences, vol. 25, No. 4, 1994, pp. 581-605.

Zhao et al., "An Intelligent Computer-Aided Assembly Process Planning System", The International Journal of Advanced Manufacturing Technology, vol. 15, 1999, pp. 332-337.

Non Final Office Action received for U.S. Appl. No. 17/220,808 dated May 28, 2025, 23 pages.

Notice of Allowance received for U.S. Appl. No. 17/220,813 dated Jun. 17, 2025, 25 pages.

* cited by examiner

GENETIC OPTIMIZATION TECHNIQUES FOR DESIGNING MANUFACTURING FACILITIES

BACKGROUND

Field of the Disclosure

Embodiments of the present disclosure relate generally to computer science and computer-aided design and, more specifically, to genetic optimization techniques for designing manufacturing facilities.

Description of the Related Art

Computer-aided design, among other things, utilizes computers to aid in creating, analyzing, modifying, and/or optimizing structural designs. In this regard, computer-aided design (CAD) applications are oftentimes used to design the layouts of manufacturing facilities for companies operating in a multitude of various industries.

In the context of manufacturing facilities, a typical facility includes a number of workstations at which manufacturing components are assembled or otherwise processed. A typical facility also has a number of loading docks that are used to unload those components from trucks or other vehicles for assembly or processing and then are used to load those components back onto trucks or vehicles once assembled or processed. For example, an automotive factory could include hundreds of loading docks and workstations that are used to assemble or process thousands of automotive components. The design of such a manufacturing facility usually includes the geometries of the different loading docks, workstations, walls, and other internal structures and spaces within the manufacturing facility. As part of the design, based on all of the different geometries associated with the manufacturing facility, different manufacturing components are assigned to particular loading docks in a manner that attempts to maximize how efficiently those manufacturing components can be delivered to and retrieved from the different workstations during the manufacturing process.

One drawback of using convention CAD software to design a manufacturing facility is that conventional CAD software does not incorporate functionality to automatically analyze different designs of a manufacturing facility. For example, conventional CAD software does not incorporate functionality to analyze a given design of a manufacturing facility based on shortest distances that different manufacturing components travel from loading docks at which those components are unloaded from trucks or other vehicles to workstations for assembly or processing and then back to loading docks at which the assembled or processed components are loaded onto trucks or other vehicles. As a general matter, designs that are associated with shorter travel distances for manufacturing components are more efficient, and preferable, to designs that are associated with longer travel distances. Because conventional CAD software does not incorporate functionality to compute the shortest distances that manufacturing components travel, during the typically design process, a designer has to manually estimate the different travel distances of manufacturing components using spreadsheets in an attempt to generate designs that are considered desirable. Oftentimes, the designer must estimate travel distances for thousands of manufacturing components for each potential design. Further, there can be numerous different potential designs, where each potential design includes different combinations of possible geometries for various aspects the manufacturing facility and/or different assignments of manufacturing components to loading docks. Accordingly, the overall process of designing a manufacturing facility using conventional CAD software and spreadsheets is typically quite tedious and time consuming.

Further, conventional spreadsheets do not incorporate functionality to accurately compute the shortest distances that components travel within a manufacturing facility. Instead, only approximations of travel distances can be generated using conventional spreadsheets. For example, a designer can approximate the travel distance of a manufacturing component using the distances between a loading dock at which the component is unloaded from a truck or vehicle to one or more corners of a manufacturing facility, from the one or more corners to one or more workstations at which the component is assembled or processed, from the one or more workstations to one or more other corners of the facility, and from the one or more other corners to another loading dock at which the component is loaded onto a truck or vehicle after assembly or processing. However, such an approximation may be inaccurate if the manufacturing component is able to traverse the manufacturing facility without actually reaching any corners of the manufacturing facility. Because the overall process of designing a manufacturing facility using spreadsheets can be inaccurate, generating and identifying designs that are associated with shortest travel distances for different manufacturing components can be quite difficult.

In addition, convention CAD software does not incorporate functionality to analyze designs of a manufacturing facility with respect to levels of congestion when multiple components simultaneously transit a manufacturing facility. As a general matter, when using conventional CAD software and spreadsheets to design a manufacturing facility, criteria other than the travel distances of manufacturing components usually are not considered. Accordingly, the design process may not account for certain criteria relevant to generating and identifying optimized designs for the manufacturing facility.

Given the above deficiencies of conventional CAD software and design approaches, only a limited number of designs for a manufacturing facility can be generated and considered during a typical design process relative to an overall design space where factors such as shortest distance and congestion are relevant when determining the relative efficiencies of different geometries associated with the various aspects of the manufacturing facility and/or different assignments of manufacturing components to loading docks. Consequently, very few, if any of the designs for manufacturing facilities generated using conventional CAD software are properly optimized.

As the foregoing illustrates, what is needed in the art are more effective techniques for designing manufacturing facilities.

SUMMARY

One embodiment of the present disclosure sets forth a computer-implemented method for designing a manufacturing facility. The method includes parsing a computer-aided design (CAD) model of the manufacturing facility to identify a plurality of geometric constraints associated with the manufacturing facility, where the plurality of geometric constraints includes one or more geometric constraints associated with one or more loading docks. The method further includes parsing metadata associated with the manufacturing facility to identify one or more manufacturing constraints associated with the manufacturing facility. In addition, the method includes performing, based on the plurality of geometric constraints and the one or more manufacturing constraints, one or more optimization operations to generate one or more designs for the manufacturing facility. In each design for the manufacturing facility, one or more manufacturing components are assigned to the one or more loading docks.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques can be incorporated into a CAD application to enable the CAD application to automatically calculate travel distances within a manufacturing facility using shortest path computations that are more accurate than the travel distance approximations generated using conventional spreadsheets. In addition, when the disclosed techniques are incorporated into a CAD application, the CAD application also can automatically account for levels of congestion within a manufacturing facility during operation, which is a factor that usually cannot be considered when generating designs using conventional CAD software. With these enhanced functionalities, a CAD application can be used to more fully explore the overall design space when designing complex manufacturing facilities and plants. Among other things, the CAD application can generate a far larger number of different designs relative to prior art approaches, and the different designs can be analyzed and compared by the CAD application in parallel. Thus, with the disclosed techniques, the likelihood of generating and identifying an optimized design for a complex manufacturing facility or other structure is increased. These technical advantages represent tangible and meaningful technological improvements over conventional CAD applications.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
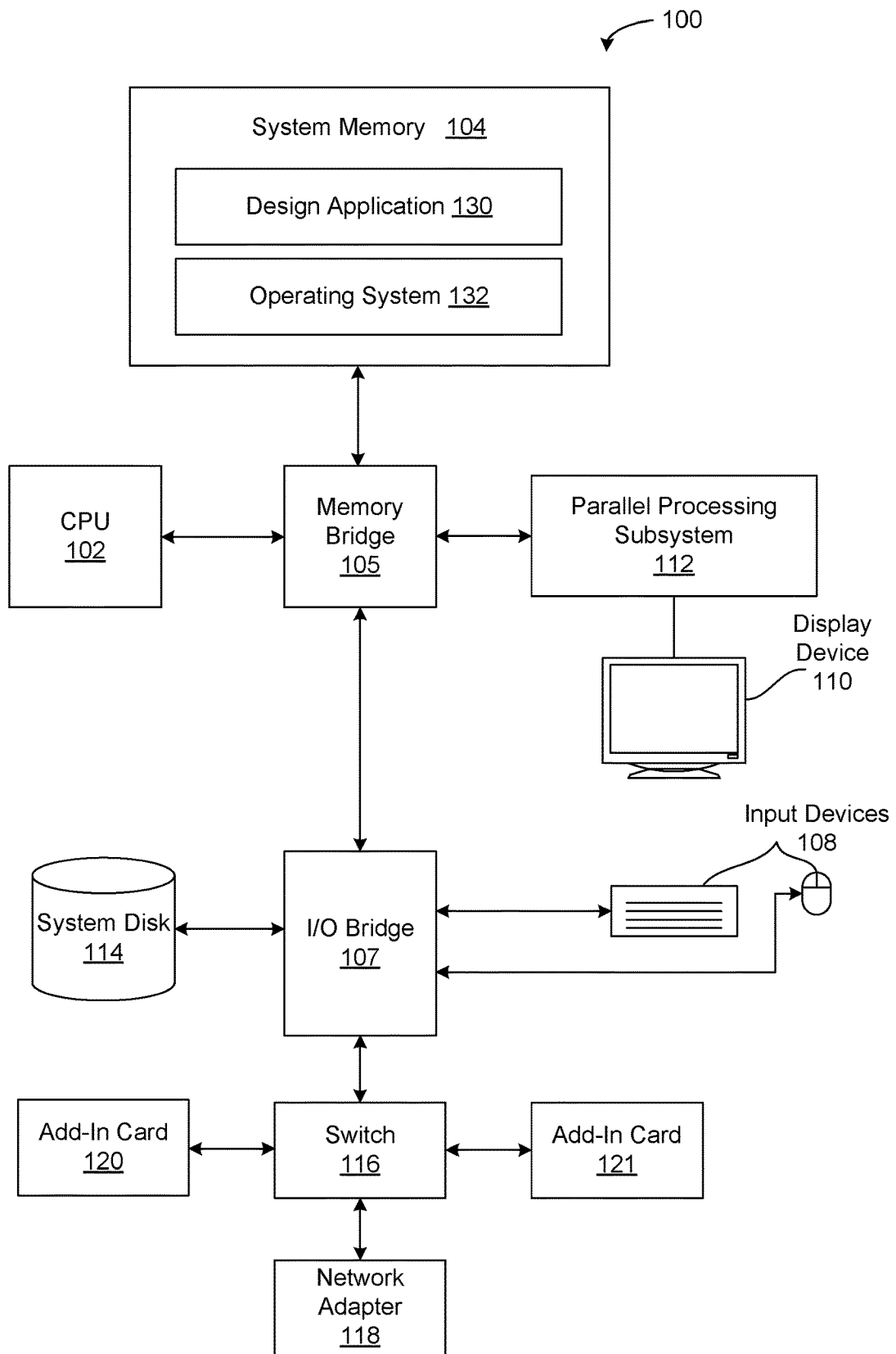
FIG. 1 is a conceptual illustration of a system configured to implement one or more aspects of the various embodiments.

FIG. 1 is a conceptual illustration of a system 100 configured to implement one or more aspects of the various embodiments. In various implementations, system 100 may be an augmented reality, virtual reality, or mixed reality system or device, a personal computer, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. The CPU 102 includes one or more processing cores, and, in operation, the CPU 102 is the master processor of the system 100, controlling and coordinating operations of other system components. The system memory 104 stores software applications and data for use by the CPU 102. The CPU 102 runs software applications and optionally an operating system. As shown, the system memory 104 stores a computer-aided design application 130 (also referred to herein as "design application 130") and an operating system 132 on which the design application 130 runs. The operating system 132 may be, e.g., Linux® or Microsoft Windows®. The design application 130 is configured to receive a computer-aided design (CAD) model of a manufacturing facility and metadata that specifies manufacturing constraints associated with the manufacturing facility. Given the CAD model and the metadata, the design application 130 performs optimization operations to generate one or more high-performing designs of the manufacturing facility.

The memory bridge 105, which may be, e.g., a Northbridge chip, is connected via a bus or other communication path (e.g., a HyperTransport link) to an I/O (input/output) bridge 107. The I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to the CPU 102 via the memory bridge 105.

A display processor 112 is coupled to the memory bridge 105 via a bus or other communication path (e.g., a PCI Express, Accelerated Graphics Port, or HyperTransport link); in one embodiment the display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

The display processor 112 periodically delivers pixels to a display device 110 (e.g., a screen or conventional CRT, plasma, OLED, SED or LCD based monitor or television). Additionally, the display processor 112 may output pixels to film recorders adapted to reproduce computer generated images on photographic film. The display processor 112 can provide the display device 110 with an analog or digital signal. In various embodiments, one or more of the various graphical user interfaces set forth in Appendices A-J, attached hereto, are displayed to one or more users via display device 110, and the one or more users can input data into and receive visual output from those various graphical user interfaces.

A system disk 114 is also connected to the I/O bridge 107 and may be configured to store content and applications and data for use by the CPU 102 and the display processor 112. The system disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between the I/O bridge 107 and other components such as a network adapter 118 and various add-in cards 120 and 121. The network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to the I/O bridge 107. For example, an audio processor may be used to generate analog or digital audio output from instructions and/or data provided by the CPU 102, the system memory 104, or the system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, the display processor 112 incorporates circuitry optimized for graphics and video processing, including, for example, video output circuitry, and constitutes a graphics processing unit (GPU). In another embodiment, the display processor 112 incorporates circuitry optimized for general purpose processing. In yet another embodiment, the display processor 112 may be integrated with one or more other system elements, such as the memory bridge 105, the CPU 102, and the I/O bridge 107 to form a system on chip (SoC). In still further embodiments, display processor 112 is omitted and software executed by the CPU 102 performs the functions of the display processor 112.

Pixel data can be provided to the display processor 112 directly from the CPU 102. In some embodiments of the present invention, instructions and/or data representing a scene are provided to a render farm or a set of server computers, each similar to the system 100, via the network adapter 118 or the system disk 114. The render farm generates one or more rendered images of the scene using the provided instructions and/or data. These rendered images may be stored on computer-readable media in a digital format and optionally returned to the system 100 for display. Similarly, stereo image pairs processed by the display processor 112 may be output to other systems for display, stored in the system disk 114, or stored on computer-readable media in a digital format.

Alternatively, the CPU 102 provides the display processor 112 with data and/or instructions defining the desired output images, from which the display processor 112 generates the pixel data of one or more output images, including characterizing and/or adjusting the offset between stereo image pairs. The data and/or instructions defining the desired output images can be stored in the system memory 104 or graphics memory within the display processor 112. In an embodiment, the display processor 112 includes 3D rendering capabilities for generating pixel data for output images from instructions and data defining the geometry, lighting shading, texturing, motion, and/or camera parameters for a scene. The display processor 112 can further include one or more programmable execution units capable of executing shader programs, tone mapping programs, and the like.

Further, in other embodiments, the CPU 102 or the display processor 112 may be replaced with or supplemented by any technically feasible form of processing device configured process data and execute program code. Such a processing device could be, for example, a central processing unit (CPU), a graphics processing unit (GPU), an application-specific integrated circuit (ASIC), a field-programmable gate array (FPGA), and so forth. In various embodiments any of the operations and/or functions described herein can be performed by the CPU 102, the display processor 112, or one or more other processing devices or any combination of these different processors.

The CPU 102, render farm, and/or the display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

In other contemplated embodiments, the system 100 may be a robot or robotic device and may include the CPU 102 and/or other processing units or devices and the system memory 104. In such embodiments, the system 100 may or may not include other elements shown in FIG. 1. The system memory 104 and/or other memory units or devices in the system 100 may include instructions that, when executed, cause the robot or robotic device represented by the system 100 to perform one or more operations, steps, tasks, or the like.

It will be appreciated that the system shown herein is illustrative and that variations and modifications are possible. The connection topology, including the number and arrangement of bridges, may be modified as desired. For instance, in some embodiments, the system memory 104 is connected to the CPU 102 directly rather than through a bridge, and other devices communicate with the system memory 104 via the memory bridge 105 and the CPU 102. In other alternative topologies the display processor 112 is connected to the I/O bridge 107 or directly to the CPU 102, rather than to the memory bridge 105. In still other embodiments, the I/O bridge 107 and the memory bridge 105 might be integrated into a single chip. The particular components shown herein are optional; for instance, any number of add-in cards or peripheral devices might be supported. In some embodiments, the switch 116 is eliminated, and the network adapter 118 and add-in cards 120, 121 connect directly to the I/O bridge 107.

Figure 2:
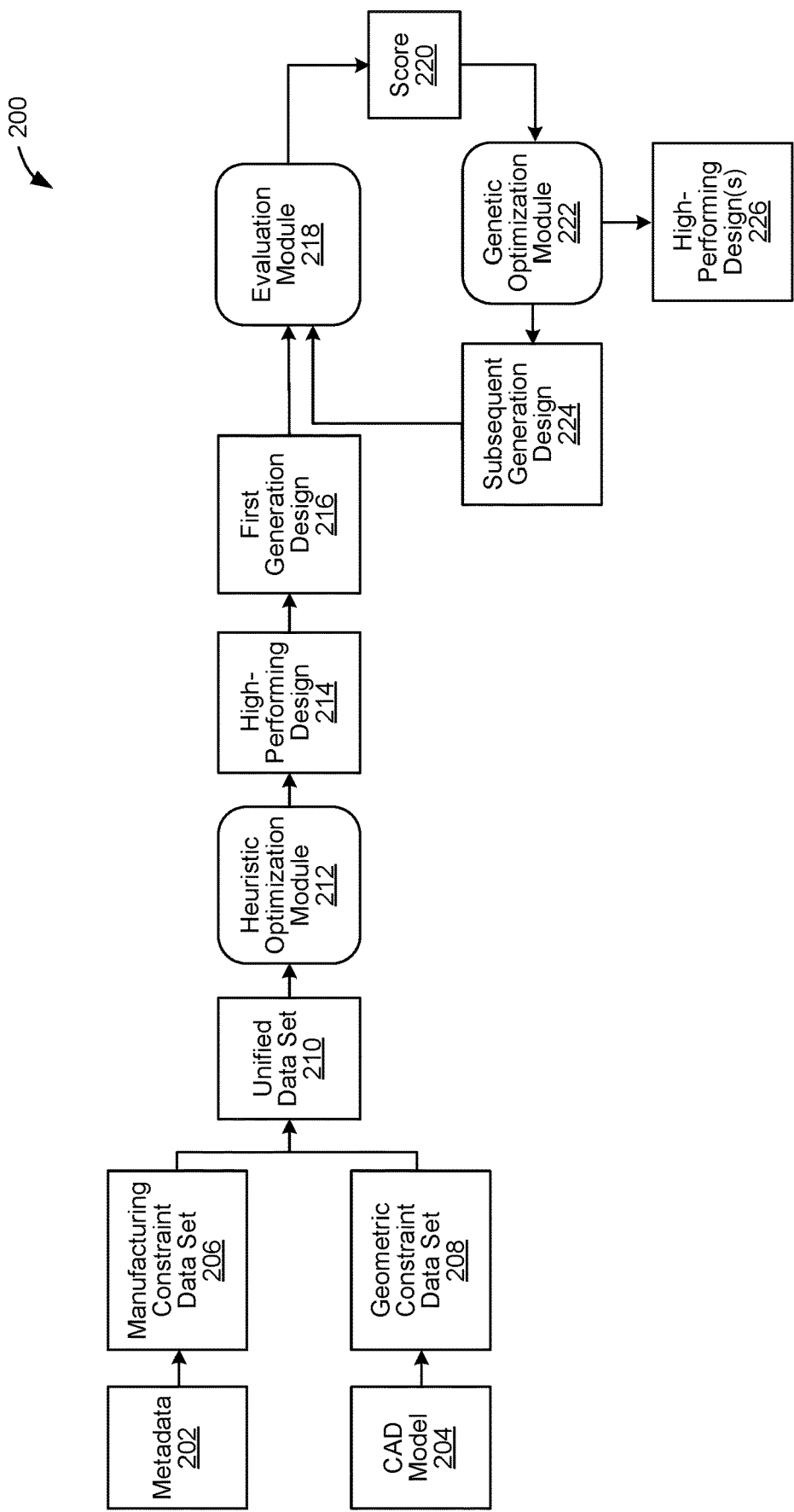
FIG. 2 is a more detailed illustration of the design application of FIG. 1, according to various embodiments.

Designing Manufacturing Facilities Based on Computer-Aided Design Models and Manufacturing Constraints FIG. 2 is a more detailed illustration of the design application 130 of FIG. 1, according to various embodiments. As shown, the design application 130 receives as inputs a computer-aided design (CAD) model 204 of a manufacturing facility and metadata 202 specifying manufacturing constraints associated with the manufacturing facility. In some embodiments, the CAD model 204 and the metadata 202 are included in one or more files specified by a user.

The design application 130 imports from the CAD model 204 a data set that includes geometric constraints 208 associated with the manufacturing facility. The importing process translates information included in the CAD model 204 into a format that can be consumed by the design application 130. Any technically feasible geometric constraints can be extracted from the CAD model 204 and converted into any suitable format. For example, in some embodiments, the design application 130 may extract, from the CAD model 204, geometric constraints that include the geometries associated with boundary walls, workstations, loading docks, areas that manufacturing components cannot traverse (i.e., no-go zones), each of which can be represented as a polynomial, from the CAD model 204. In such cases, the design application 130 could execute one or more scripts (e.g., a Dynamo® and a Python® script) that parses the CAD model 204 to extract the data set of geometric constraints 208 and stores the same in a file (e.g., a JavaScript Object Notation (JSON) file). Although described herein with respect to the CAD model 204, geometric constraints can also be imported from other sources in addition to, or in lieu of the CAD model 204. For example, the locations of workstations and no-go zones could be imported from the metadata 202 associated with the manufacturing facility. In addition, although the CAD model 204 and the metadata 202 shown as being separate for illustrative purposes, the CAD model 204 and the metadata 202 can be stored in any number of files, including in the same file.

Figure 3:
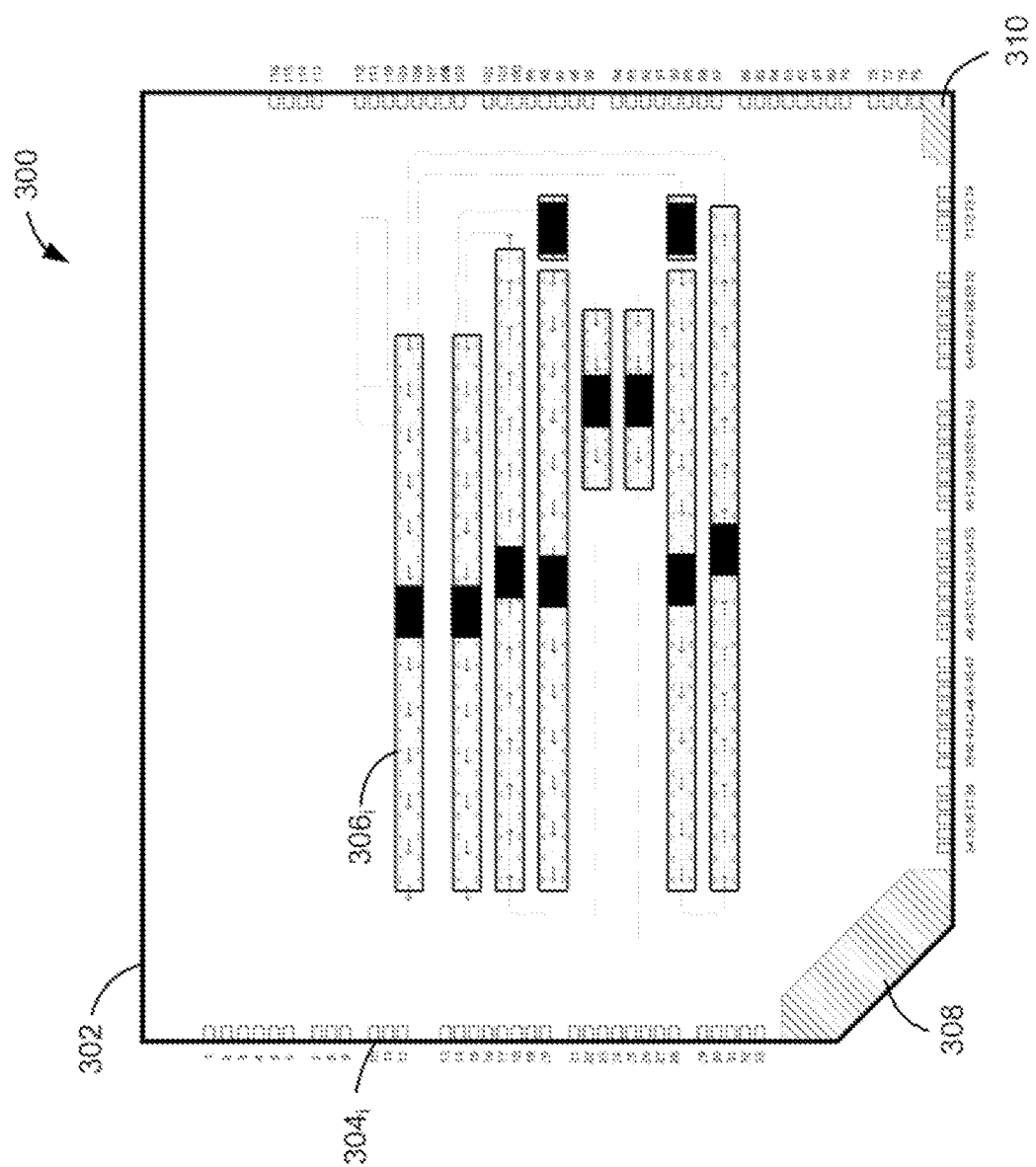
FIG. 3 illustrates a set of geometric constraints associated with an exemplar manufacturing facility, according to various embodiments.

FIG. 3 illustrates a set of geometric constraints 300 associated with an exemplar manufacturing facility, according to various embodiments. As shown, the geometric constraints 300 include the geometries and locations of a boundary wall 302 surrounding the manufacturing facility; multiple loading docks $304_i$ (referred to herein individually as a loading dock 304 and collectively as loading docks 304) where manufacturing components start from and end at during the manufacturing process; multiple workstations $306_i$ (referred to herein individually as a worksite 306 and collectively as worksites 306) where work, such as modifying a manufacturing component or combining two manufacturing components together, are performed; and no-go zones 308 and 310 that cannot be traversed by the manufacturing components. In some embodiments, the manufacturing components are unloaded from vehicles at one or more of the loading docks 304, after which the manufacturing components are moved (e.g, on pallets) to various workstations 306 for processing, before being loaded back onto vehicles at one or more of the loading docks 304.

Returning to FIG. 2, in addition to importing the CAD model 204, the design application 130 imports, from the metadata 202, a data set that includes manufacturing constraints 206 associated with the manufacturing facility. In some embodiments, the design application 130 executes a script (e.g., a Python® script) that parses the metadata 202 to extract the data set of manufacturing constraints 206 and stores the same in a file (e.g., a JSON file). The metadata 202 can include any technically feasible manufacturing constraints. For example, in some embodiments, the manufacturing constraints may include the speed at which manufacturing components can be moved in terms of trips per unit time (e.g., pallets per hour), whether a particular manufacturing component starts from and ends at the same loading dock during the manufacturing process, groupings of manufacturing components, etc. Manufacturing components that are grouped together are processed together or sequentially, requiring those manufacturing components to start from and end at the same loading docks as each other. For example, one manufacturing component could be required to install another manufacturing component, and those manufacturing components may be grouped together.

The design application 130 combines the data set of geometric constraints 208 and the data set of manufacturing constraints 206 to generate a unified data set 210 that includes both geometric constraints and manufacturing constraints. The design application 130 can extract the data set of geometric constraints 208 and the data set of manufacturing constraints 206, and combine the same to generate the unified data set 210, in any technically feasible manner. As described, in some embodiments, the design application 130 executes one or more scripts that parse the CAD model 204 and the metadata 202 to extract the data set of geometric constraints 208 and the data set of manufacturing constraints 206, respectively. In such cases, the extracted data set of geometric constraints 208 and the extracted data set of manufacturing constraints 206 may initially be stored in different files (e.g., JSON files), before being combined into the unified data set 210 that is stored in a single file (e.g., a JSON file).

To generate one or more high-performing designs of the manufacturing facility, a genetic optimization module 222 performs a genetic optimization technique based on the unified data set 210 of geometric and manufacturing constraints. For example, in some embodiments, the genetic optimization module 222 may perform the non-dominated sorting genetic algorithm II (NSGAII). Illustratively, the genetic optimization technique begins with a first generation design 216 of the manufacturing facility, and iterates through multiple subsequent generations of designs 224 of the manufacturing facility to converge on one or more high-performing designs 226. The one or more high-performing designs 226 can then be output to a user via, e.g., a graphical user interface. Although described herein primarily with respect to genetic optimization techniques, which are effective at optimizing multiple optimization objectives, any technically feasible optimization techniques may be used in other embodiments. For example, gradient descent techniques may be used in some embodiments.

Each of the designs 216, 224, and 226 is generated to satisfy the geometric and manufacturing constraints specified in the unified data set 210. In some embodiments, each of the designs 216, 224, and 226 includes an assignment of manufacturing components to loading docks of the manufacturing facility from which the manufacturing components start and at which the manufacturing components end during the manufacturing process. As described, the manufacturing constraints may require that the manufacturing components be processed at particular workstations, begin from and end at the same loading dock, be processed in certain groups, among other things, and the geometric constraints can require that manufacturing components only traverse certain areas of the manufacturing facility, among other things. Different assignments of manufacturing components to loading docks can result in the manufacturing components taking different paths through the manufacturing facility during the manufacturing process. Some of those paths may be shorter, require fewer turns that can be difficult or time-consuming to perform by a vehicles carrying the manufacturing components, and/or produce less congestion than other paths.

Figure 4:
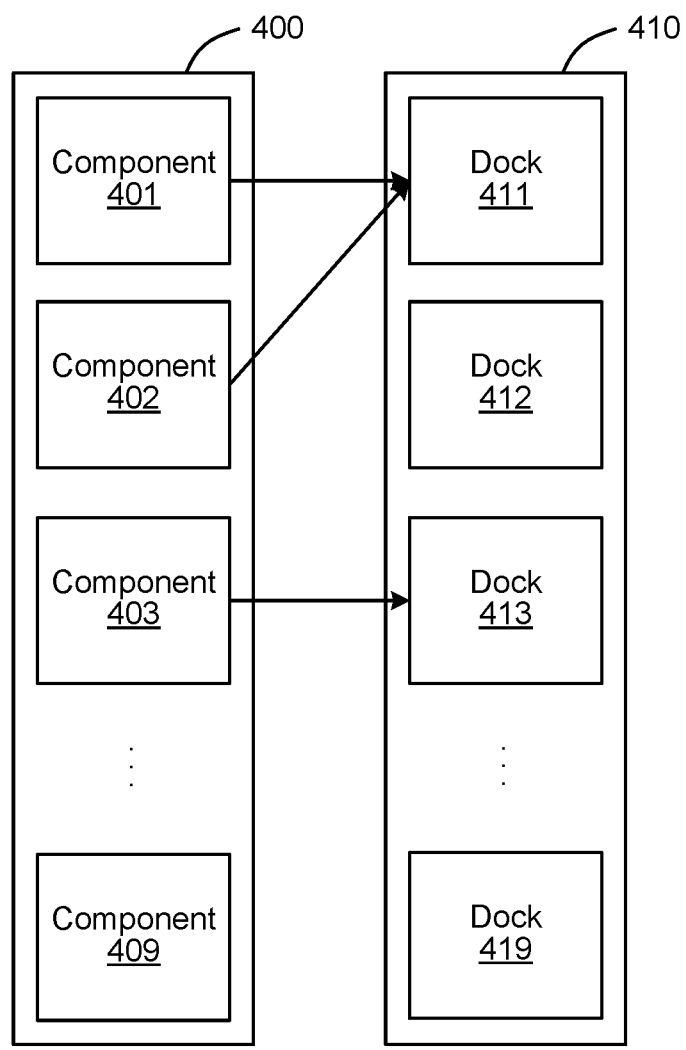
FIG. 4 illustrates how manufacturing components are assigned to different loading docks within an exemplar manufacturing facility, according to various embodiments.

FIG. 4 illustrates how manufacturing components are assigned to different loading docks within an exemplar manufacturing facility, according to various embodiments. As shown, a manufacturing component 401 is assigned to a loading dock 411, a manufacturing component 402 is assigned to the loading dock 411, a manufacturing component 403 is assigned to a loading dock 413, and a manufacturing component 410 is assigned to a loading dock 420. Although the same number of manufacturing components 401-409 and loading docks 411-419 is shown for illustrative purposes, the number of manufacturing components may generally be different from the number of loading docks. Although an assignment of the manufacturing components 401-409 to loading docks from which the manufacturing components 401-409 start during manufacturing is shown for illustrative purposes, the manufacturing components 401-409 can also be assigned to loading docks at which the manufacturing components 401-409 end in a similar manner. In some embodiments, manufacturing components are assigned to both starting and ending loading docks. For example, each manufacturing component could be transported on a pallet and make a round trip from a starting loading dock to one or more workstations, and then to an ending loading dock that is the same as the starting loading dock or an adjacent loading dock. In addition, manufacturing components can share starting and/or ending loading docks if there are more manufacturing components than loading docks.

In some embodiments, the assignment of manufacturing components to loading docks is based on an ordering of the loading docks relative to an ordering of the manufacturing components, and on manufacturing constraints specified in the unified data set 210. As shown, the design application 130 has generated an ordered list 400 that includes the ordering of the manufacturing components 401-409 and another ordered list 410 that includes the ordering of the loading docks 411-419. In some embodiments, each of the manufacturing components 401-409 and the loading docks 411-419 is represented by a distinct integer value in the ordered lists 400 and 410, respectively. Although described herein with respect to integers, any technically feasible discrete parameters, such as strings as objects, may be used instead of integers in other embodiments. Although described herein primarily with respect to ordered lists, other embodiments may utilize arrays or other data structures to store the orderings of manufacturing components and loading docks.

In some embodiments, the design application 130 determines a fixed ordering of the manufacturing components 401-409 based on the number of trips per unit of time (e.g., a number of pallets per hour) for each of the manufacturing components. Doing so biases the optimization process to prioritize manufacturing components that travel the most, which can affect the efficiency of the manufacturing the process the greatest. As described in greater detail below, the design application 130 re-orders (i.e., permutes) the ordering of the loading docks 411-419 during multiple iterations of a genetic optimization technique, such that the manufacturing components 401-409 are assigned to different loading docks 411-419 based on the fixed ordering of the manufacturing components 401-409 relative to the re-ordered loading docks 411-419, until the optimization converges on one or more orderings of the loading docks 411-419 that are associated with high performing designs of the manufacturing facility.

Returning to FIG. 2, each of the designs 216 and 224 include different assignments of manufacturing components to loading docks from which the manufacturing components start and at which the manufacturing components end during the manufacturing process. As described, the design application 130 performs a genetic optimization technique that iterates through multiple generations of designs of the manufacturing facility to converge on one or more high-performing designs 226. Genetic optimization techniques generate solutions to optimization problems using biologically inspired operations such as mutation, crossover, and selection operations that combine the designs of previous generations, which are also referred to as "parent" designs, or slightly changes one or more of those designs, to generate the design of a subsequent generation, which is also referred to herein as a "child" design. In some embodiments, mutation, crossover, and selection operations are performed to re-order the loading docks relative to a fixed ordering of manufacturing components in each generation of designs of a manufacturing facility. As described, such re-orderings of the loading docks are associated with different assignments of manufacturing components to loading docks, i.e., different designs of the manufacturing facility.

In some embodiments, the genetic optimization technique includes a crossover operator that operates on discrete parameters and ordered lists. For example, in some embodiments, the order crossover (also sometimes referred to as the "OX crossover") may be used. Because discrete identifier values, such as integer values, can be assigned to each of the manufacturing components and the loading docks, a crossover operator that operates on discrete parameters is more appropriate for solving the combinatorial problem of assigning manufacturing components to loading docks than a crossover operator that operates on continuous parameters. Experience has shown that a crossover operator that operates on discrete parameters and ordered lists can be used to explore the design space of a manufacturing facility more fully, and result in better improvements in performance from generation to generation that does not reproduce the same designs, relative to a crossover operator that operates on continuous parameters. As described, in some embodiments, the design application 130 generates a fixed ordered list that includes integer values representing manufacturing components and re-orders, via genetic optimization, a corresponding ordered list that includes integer values representing loading docks. In such cases, the ordered list representing the loading docks can be re-ordered across a number of generations of the genetic optimization, until the genetic optimization converges to one or more ordered lists representing the loading docks that, in conjunction with the fixed ordered list representing the manufacturing components, are associated with assignments of the manufacturing components to the loading docks that correspond to one or more high-performing designs of the manufacturing facility. It should be noted that an ordered list generated by a crossover operator that operates on continuous parameters may also include non-integers that need to be converted back into integers that represent loading docks, which is not required for an ordered list generated by a crossover operator that operates on discrete parameters and ordered lists.

Figure 5:
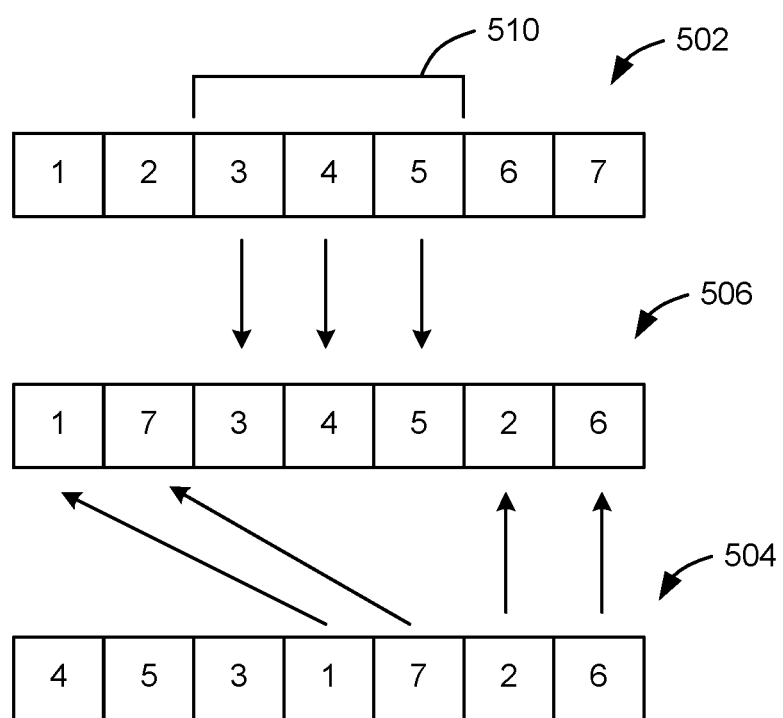
FIG. 5 illustrates the application of a crossover operator to exemplar ordered lists, according to various embodiments.

FIG. 5 illustrates the application of a crossover operator to exemplar ordered lists, according to various embodiments. As shown, the crossover operator combines, or "mates," two ordered lists 502 and 504 of integers representing loading docks associated with parent designs into an ordered list 506 representing loading docks associated with a child design. In some embodiments, two designs from any previous generations can be crossed over, and higher-scoring designs are more statistically likely to be chosen as the two parent designs.

In some embodiments, the crossover operator (1) copies items from one or more continuous ranges in an ordered list associated with one parent design to an ordered list associated with a child design; and (2) copies, in a relative order, one or more items that are not included in the one or more continuous ranges from an ordered list associated with another parent design to the ordered list associated with the child design. Illustratively, a continuous range 510 of items from the ordered list 502 representing loading docks associated with one parent design has been copied to the ordered list 506 representing loading docks associated with the child design. The positions of the items in the continuous range 510 are not changed from the ordered list 502 associated with the parent design to the ordered list 506 associated with the child design. In addition, items are copied from the ordered list 504 representing loading docks associated with the other parent design to positions in the ordered list 506 representing loading docks associated with the child design that remain empty after the items from the continuous range 510 were copied to the ordered list 506. When the items are copied from the ordered list 504 associated with the other parent design to the ordered list 502 associated with the child design, the positions of those items can be changed from the positions in the ordered list 504 associated with the other parent design, but the relative ordering of those items is not changed.

Returning to FIG. 2, during each iteration of the genetic optimization technique, an evaluation module 220 in the design application 130 evaluates the design of the current generation based on a travel distance, a level of congestion, and a number of turns associated with paths traversed by the manufacturing components. In some embodiments, the evaluation module 220 performs a shortest path technique to compute the shortest path that each manufacturing component can travel across a grid from the starting and ending loading docks for that manufacturing component in the design and the geometric and the manufacturing constraints in the unified data set 210. For example, in some embodiments, well-known shortest path algorithms may be employed to compute shortest paths for the manufacturing components that pass through nodes on a grid. After computing the shortest paths that the manufacturing components can travel for the design of a given generation, the evaluation module 220 computes a performance score 220 for that design based on the shortest paths, a travel distance score, a congestion score, and turning score. In some embodiments, the travel distance score is computed as a sum of lengths of the shortest paths; the congestion score is computed based on a number of times nodes in a grid are traversed by the shortest paths; and the turning score is computed as a weighted sum of the angles of turns in the shortest paths, with the turning angles of each path being weighted by the number of trips per unit of time (e.g., pallets per hour) that the manufacturing components associated with those paths make. In other embodiments, any technically feasible metrics may be used compute the performance score 220 for the current generation. Thereafter, the genetic optimization module 222 can generate the design of a subsequent generation by re-ordering the ordering of loading docks via mutation, crossover, and/or selection operations based on one or more performance scores associated with designs in one or more previous generations. In particular, the design of a subsequent generation may be more similar to, such as including more portions of, higher-performing designs from previous generations and less similar to lower-performing designs from previous generations. Over a number of generations, the genetic optimization will converge to one or more high-performing designs that are associated with high performance scores, i.e., one or more designs that optimize for travel distance, congestion, and number of turns.

Figure 6:
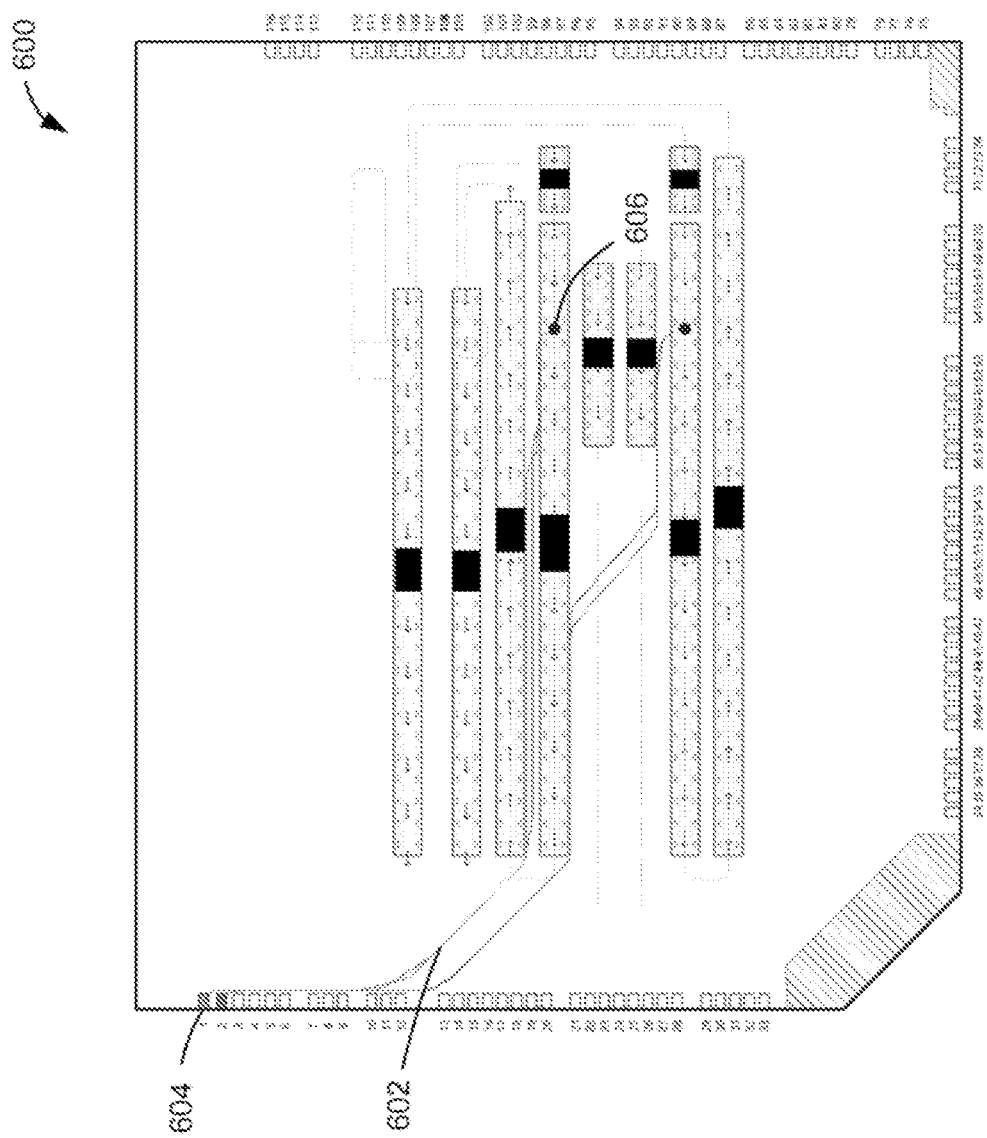
FIG. 6 illustrates a set of paths through the exemplar manufacturing facility of FIG. 3, according to various embodiments.

FIG. 6 illustrates a set of paths through the exemplar manufacturing facility of FIG. 3, according to various embodiments. As shown, a path 602 of one manufacturing component begins from a loading dock 604 and returns to the same loading dock 604 after going to a workstation 606. The example of FIG. 6 assumes that, in the design of the current generation, the manufacturing component has been assigned to start from and end at the loading dock 604 based on the ordering of the loading docks, described above. The example further assumes that the unified data set 210 includes the geometric constraints described above in conjunction with FIG. 3, as well as manufacturing constraints specify that the manufacturing component starts from and ends at the same loading dock, and the manufacturing component is processed at the workstation 606. As described, in some embodiments, the design application 130 computes the path 602 using a shortest path technique based on the assignment of the manufacturing component to the loading dock 604 as the starting and ending docks for the manufacturing component, the geometric constraints, and the manufacturing constraints. Illustratively, the path 602 is computed to pass through nodes of a grid 602.

Returning to FIG. 2, the design application 130 can optionally include a heuristic optimization module 212 that performs a heuristic optimization technique to generate a high-performing design 214 of the manufacturing facility that satisfies the manufacturing constraints 206 and the geometric constraints 208. In some embodiments, the design application 130 uses the high-performing design 214 to initialize the design of a first generation 216 of a genetic optimization technique. The first generation design 216 is sometimes also referred to as the "design of experiment." For example, in some embodiments, the heuristic optimization module 212 may perform a binary search to generate the high-performing design 214 in which some manufacturing components, such as manufacturing components that travel the most in a unit of time, are optimized with respect to an objective, such as travel distance. The steps of an exemplar binary search technique are described in greater detail below in conjunction with FIG. 8 and can be and can be used optimize the assignment of a manufacturing component to a loading dock in a number of steps. More generally, any technically feasible heuristic optimization technique, such as binary search, brute force search, ant colony optimization, greedy fill, gradient descent, and resource allocation techniques, may be used to optimize any number of manufacturing components with respect to any number of objectives. Experience has shown that using the high-performing design 214 generated by a heuristic optimization technique as the first generation design 216 can improve the performance of genetic optimization and result in faster convergence to one or more high-performing designs 226, particularly when a large number of manufacturing components need to be assigned to a large number of loading docks. If the high-performing design 214 generated by the heuristic optimization technique is not used, a genetic optimization technique can take a relatively long time to a converge to an optimal assignment of a large number of manufacturing components to a large number of loading docks.

In other embodiments, the design application 130 may initialize the first generation design 216 without performing a heuristic optimization technique. For example, the first generation design 216 may be initialized based on a pseudo-random, factorial, or regular sampling assignment of manufacturing components to loading docks from which the manufacturing components start and at which the manufacturing components end during the manufacturing process. In further embodiments, the first generation design 216 may be initialized based on both a heuristic optimization technique and a pseud-random, factorial, or regular sampling assignment of manufacturing components to loading docks from which the manufacturing components start and at which the manufacturing components end.

Although FIG. 2 is described with respect to a single CAD model 204 and metadata 202 associated with a manufacturing facility, the design application 130 can also evaluate multiple CAD models that represent different geometric constraints for the manufacturing facility, in order to determine high-performing designs (i.e., high-performing assignments of manufacturing components to loading docks) for each of those CAD models. In some embodiments, the design application 130 may compare high-performing designs for multiple CAD models of a manufacturing facility based on travel distance, congestion, and number of turns, to determine one or more designs that are associated with the highest performance scores. The design application 130 can then output the one or more designs to a user via a graphical user interface, or utilize the one or more designs in any technically feasible manner.

Figure 7:
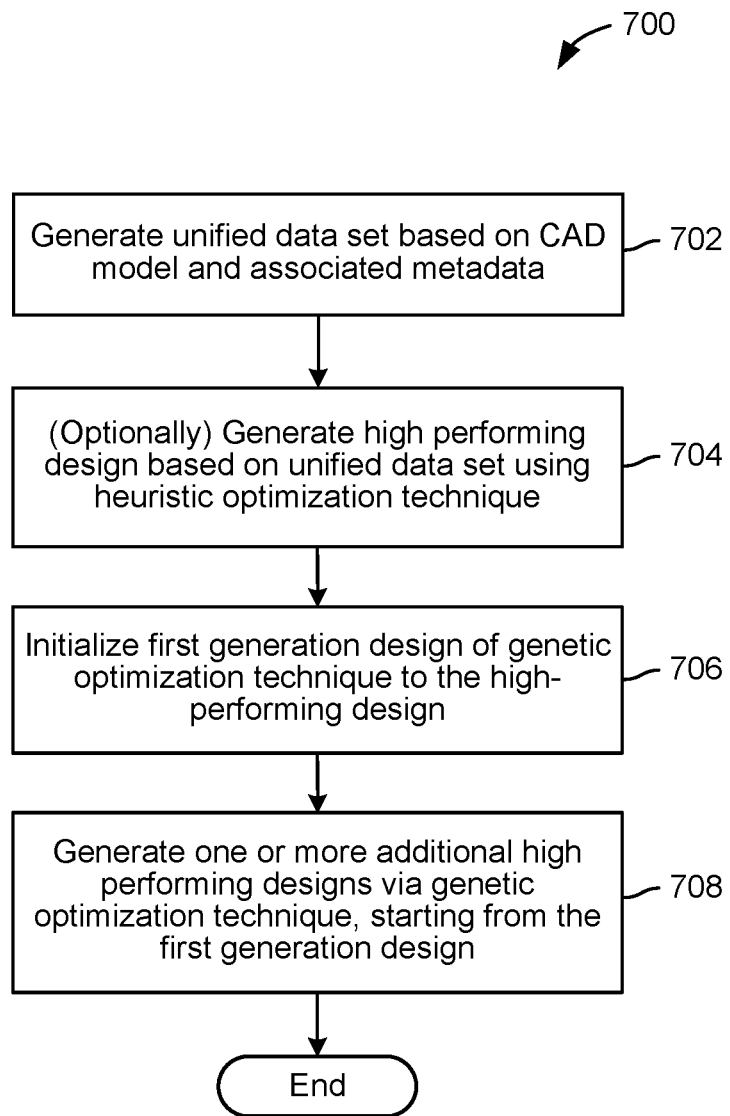
FIG. 7 is a flow diagram of method steps for generating one or more designs for a manufacturing facility, according to various embodiments.

FIG. 7 is a flow diagram of method steps for generating one or more designs for a manufacturing facility, according to various embodiments. Although the method steps are described with reference to the system of FIGS. 1-2, persons skilled in the art will understand that any system configured to implement the method steps, in any order, falls within the scope of the present invention.

As shown, a method 700 begins at step 702, where the design application 130 generates a unified data set based on a CAD model and metadata associated with a manufacturing facility. In some embodiments, the design application 130 imports geometric constraints from the CAD model and manufacturing constraints from the metadata, as described above in conjunction with FIGS. 2-3.

At step 704, the design application 130 optionally generates a high-performing design based on the unified data set using a heuristic optimization technique. The design application 130 may perform any technically feasible heuristic optimization technique to optimize any number of manufacturing components with respect to any number of objectives. In some embodiments, the design application 130 performs a binary search to generate a high-performing design in which a subset of manufacturing components that travel the most in a unit of time are optimized with respect to travel distance and the manufacturing and geometric constraints specified in the unified data set are satisfied.

Figure 8:
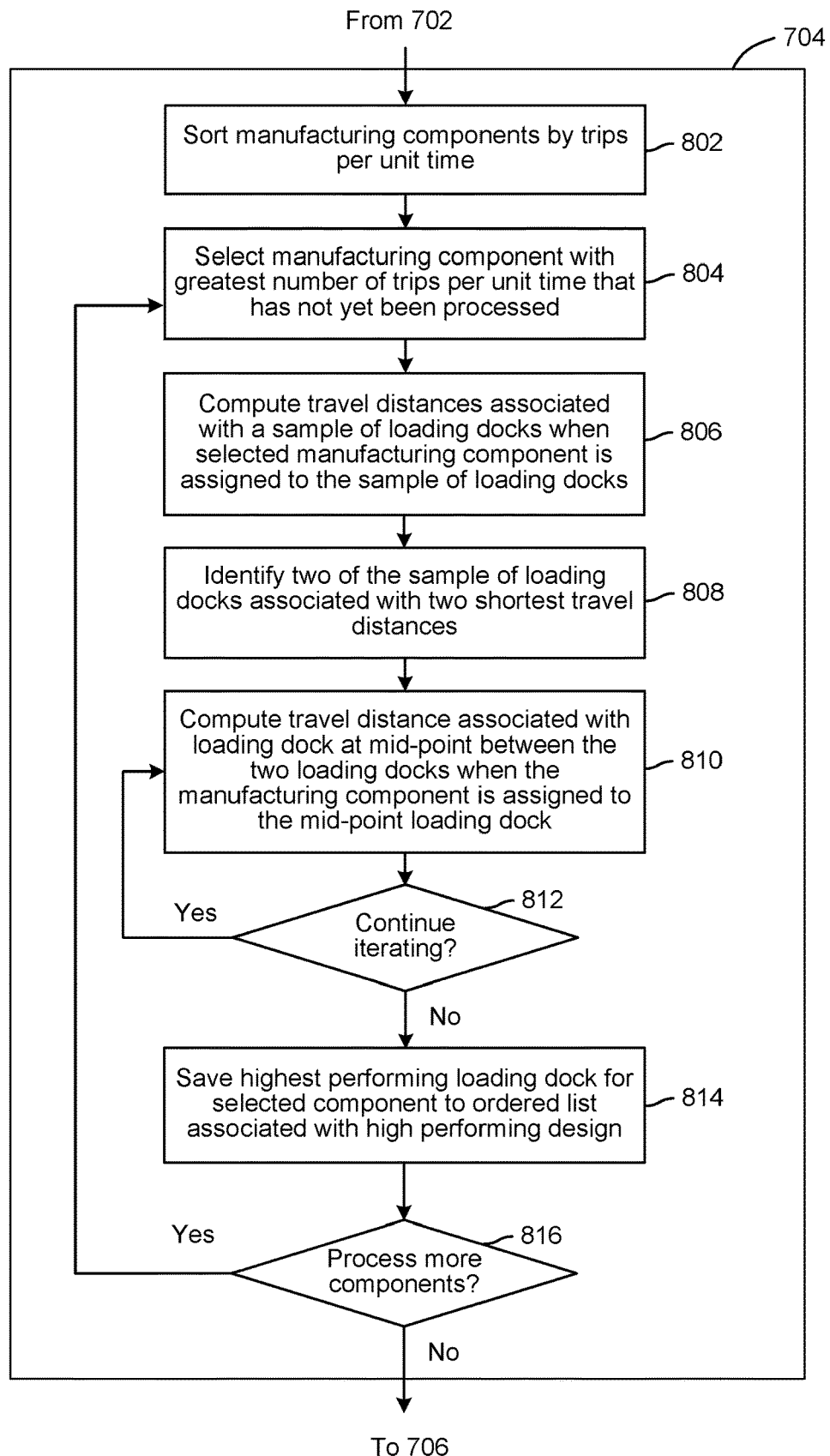
FIG. 8 is a flow diagram of method steps for generating a design for a manufacturing facility via a heuristic optimization technique, according to various embodiments.

FIG. 8 is a flow diagram of method steps for generating a design for a manufacturing facility via a binary search at step 704, according to various embodiments. Although the method steps are described with reference to the system of FIGS. 1-2, persons skilled in the art will understand that any system configured to implement the method steps, in any order, falls within the scope of the present invention.

As shown, at step 802, the design application 130 sorts the manufacturing components by trips traveled by the manufacturing components per unit time. In some embodiments, a binary search is only performed to optimize the assignments of a subset of manufacturing components associated with the highest number of trips per unit time to loading docks. Optimizing the assignments of the subset of manufacturing components associated with the highest number of trips unit time can have a relatively large effect on the overall travel distance of the manufacturing components. For example, the design application 130 could optimize the assignments to loading docks for ten percent of the manufacturing components associated the highest number of trips per unit time.

At step 804, the design application 130 selects a manufacturing component associated with the highest number of trips per unit time that has not yet been processed.

At step 806, the design application 130 computes travel distances associated with a sample of loading docks when the selected manufacturing component is assigned to those loading docks. In some embodiments, the design application 130 selects a sample (e.g., five) of loading docks that are equally spaced apart, assigns the selected manufacturing component to each of the sampled loading docks, and computes a travel distance for the manufacturing component during the manufacturing process given each of those assignments. The travel distances may be computed in any technically feasible manner, such as using the shortest path technique described above in conjunction with FIGS. 5-6.

At step 808, the design application 130 identifies two loading docks from the sample of loading docks that are associated with two shortest travel distances computed at step 806.

At step 810, the design application 130 computes a travel distance associated with a loading dock that is at, or closest to, a mid-point between the two loading docks identified at step 808 when the manufacturing component is assigned to the mid-point loading dock.

Then, at step 812, the design application 130 determines whether to continue iterating. In some embodiments, the design application 130 continues iterating until a midpoint is at n−1 or n+1 from loading docks associated with the shortest travel distances determined at step 808. The loading dock with the shortest travel distance of either the midpoint or the two docks selected at step 808 is then saved for step 814, described in greater detail below.

If the design application 130 determines to continue iterating, then the method 700 returns to step 810 where, based on the previously determined two loading docks, including the mid-point loading dock, that are associated with the shortest travel distances, the design application 130 computes a travel distance associated with a loading dock that is at, or closest to, a mid-point between those two loading docks.

On the other hand, if the design application 130 determines to stop iterating, then at step 814, the design application 130 saves the highest performing loading dock for the selected manufacturing component to an ordered list associated with the high performing design that is output at step 704 of the method 700. As described, the high performing design may be represented by an ordered list of loading docks that, together with the ordered list of manufacturing components determined at step 802, indicates assignments of the manufacturing components to loading docks.

At step 816, if more manufacturing components are to be processed, then the method 700 returns to step 804, where the design application 130 selects another manufacturing component associated with the highest number of trips per unit time that has not yet been processed. As described, in some embodiments, the design application 130 processes a subset of manufacturing components, such as a percent of the manufacturing components associated with the highest number of trips per unit time.

On the other hand, if no more manufacturing components are to be processed, then the method 700 continues to step 706.

Returning to FIG. 7, at step 706, if the design application 130 optionally generated the high-performing design at step 704, then the design application 130 initializes a first generation design of a genetic optimization technique to the high-performing design. As described, initializing the first generation design to the high-performing design generated via the heuristic optimization technique can help bypass the lowest-performing parts of the design space, thereby permitting the genetic optimization technique to converge relatively quickly to one or more improved high-performing designs of the manufacturing facility. In embodiments in which optional steps 704 and 706 are not performed, the genetic optimization technique may begin with a first generation design that includes a pseudo-random, factorial, regular sampling or any other technically feasible assignment of manufacturing components to loading docks.

At step 708, the design application 130 generates one or more additional high-performing designs of the manufacturing facility via a genetic optimization technique, starting from the first generation design. For example, in some embodiments, the NSGAII genetic optimization technique may be performed. Over multiple iterations, the genetic optimization technique converges to the one or more additional high-performing designs, which may then be output to a user via, e.g., a graphical user interface or utilized in any technically feasible manner.

Figure 9:
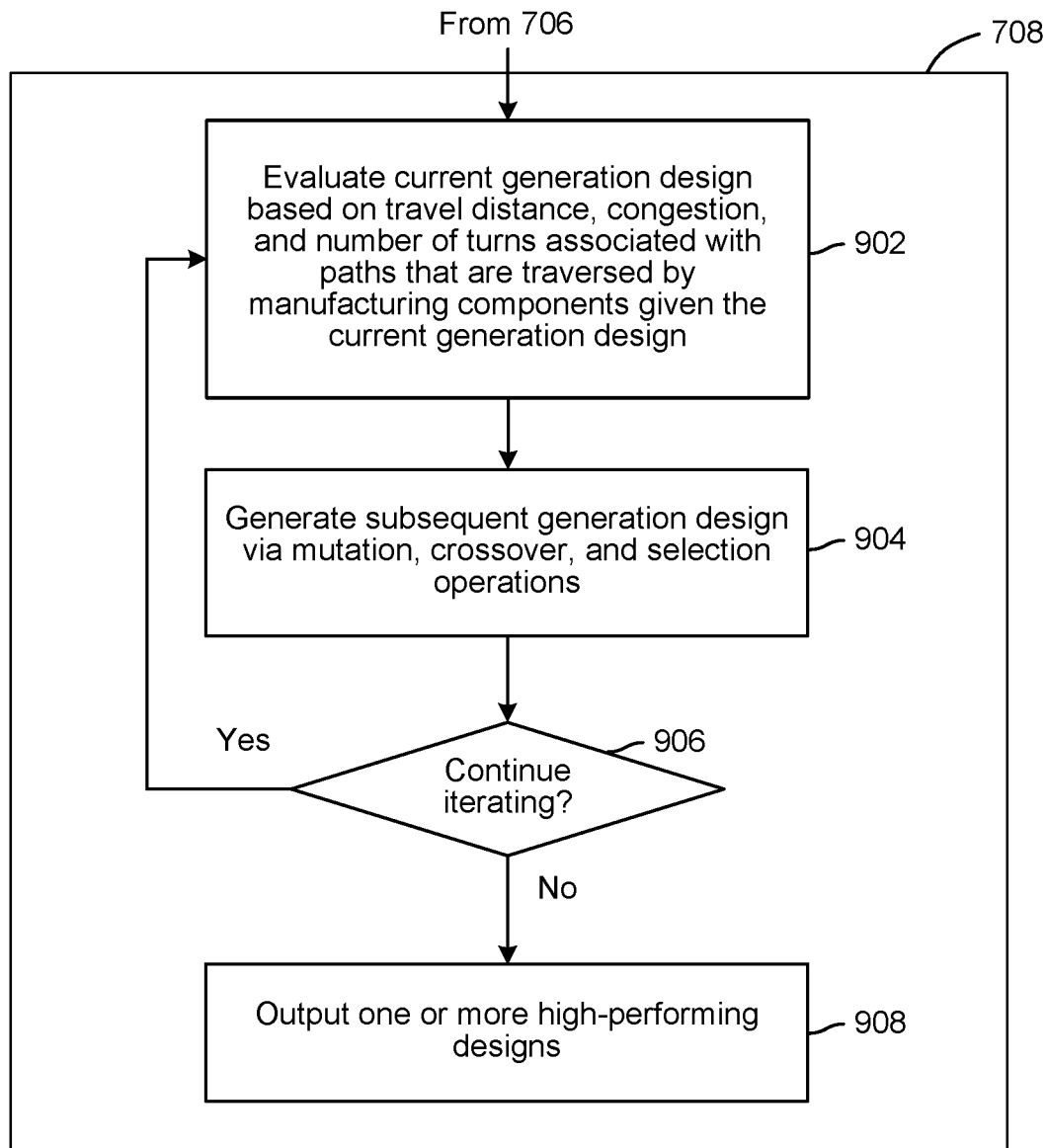
FIG. 9 is a flow diagram of method steps for generating one or more designs for a manufacturing facility via a genetic optimization technique, according to various embodiments.

FIG. 9 is a flow diagram of method steps for generating one or more additional high-performing designs via the genetic optimization technique at step 708, according to various embodiments. Although the method steps are described with reference to the system of FIGS. 1-2, persons skilled in the art will understand that any system configured to implement the method steps, in any order, falls within the scope of the present invention.

As shown, at step 902, the design application 130 evaluates a current generation design of the manufacturing facility based on a travel distance, congestion, and number of turns associated with paths that are traversed by manufacturing components given the current generation design. In some embodiments, the design application 130 computes the paths traversed by each manufacturing component across a grid using a shortest path technique. In some embodiments, the design application 130 computes a travel distance score that is a sum of lengths of the paths traversed by each manufacturing component. The design application 130 further computes a congestion score based on the number of times nodes in the grid are traversed by the paths. In some embodiments, the congestion score can be computed based on whether any nodes are traversed by a large number of paths, indicating that those nodes are over-used choke points that can slow down the movement of manufacturing components during the manufacturing process. In addition, the design application 130 computes a turning score as a weighted sum of the angles of turns in the paths. In the weight sum, the turning angles of each path are weighted by the number of trips per unit of time (e.g., the number of pallets per hour) that manufacturing components traversing those paths make. In other embodiments, any technically feasible metrics may be used to evaluate the current generation design.

At step 904, the design application 130 generates the design of a subsequent generation via mutation, crossover, and/or selection operations. In some embodiments, the genetic optimization operations include a crossover operator that operates on discrete parameters and ordered lists, such as an order crossover, to generate the subsequent generation design.

At step 906, if a terminating condition, such as a maximum number of iterations or a lack of improvement for a number of generations, has not been reached, then the method 700 returns to step 902, where the design application 130 again evaluates a current generation design of the manufacturing facility based on a travel distance, congestion, and number of turns associated with paths that are traversed by manufacturing components given the current generation design.

On the other hand, if a terminating condition, such as a maximum number of iterations or a lack of improvement for a number of generations, is reached, then the method 700 continues to step 908, where the design application 130 outputs one or more high-performing designs of the manufacturing facility. Any number of high-performing designs, which are determined based the same criteria (e.g., travel distance, congestion, and number of turns) as step 902, can be output or otherwise utilized, in any technically feasible manner. It should be noted that if the manufacturing facility design is optimized with respect to a single objective (e.g., travel distance), then the genetic optimization technique may generate one design that performs better than other designs. On the other hand, if the manufacturing facility design is optimized with respect to multiple objectives (e.g., travel distance, congestion, and number of turns), then the design application 130 may generate multiple high-performing designs, some of which are more optimized for certain objectives than others.

Figure 10:
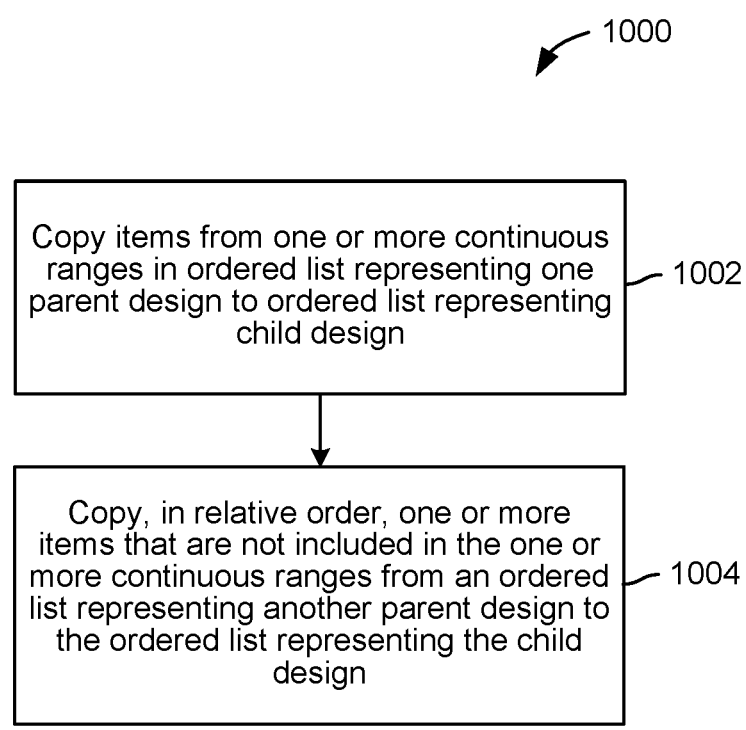
FIG. 10 is a flow diagram of method steps for performing operations associated with a crossover operator, according to various embodiments.

FIG. 10 is a flow diagram of method steps for performing operations associated with a crossover operator at step 904, according to various embodiments. Although the method steps are described with reference to the system of FIGS. 1-2, persons skilled in the art will understand that any system configured to implement the method steps, in any order, falls within the scope of the present invention.

As shown, a method 1000 begins at step 1002, where given two parent designs from two previous generations of the genetic optimization, the design application 130 copies items from one or more continuous ranges in an ordered list representing one parent design to an ordered list representing a child design. As described, in some embodiments, two designs from any previous generations can be crossed over, and higher-scoring designs are more statistically likely to be chosen as the two parent designs. It should be noted that, at step 1002, the positions of the items in the one or more continuous ranges of the parent design are not changed from an ordered list representing the parent design to an ordered list representing the child design. In some embodiments, a parent design may not be changed at all in some cases and then crossed over with another design in a n–1 generation.

At step 1004, the design application 130 further copies, in a relative order, one or more items that are not included in the one or more continuous ranges from an ordered list representing the other parent design to the ordered list representing the child design. In particular, the one or more items are copied to positions in the ordered list representing the child design that remain empty after the items from the continuous range(s) were copied at step 1002. The positions of the one or more items can be changed from the ordered list representing the parent design to the ordered list representing the child design, but the relative ordering of the one or more items remain unchanged.

Although described with respect to a single CAD model and associated metadata, the method 700 described above in conjunction with FIGS. 7-10 can be repeated for multiple CAD models associated with different manufacturing facility geometries to determine high-performing designs (i.e., high-performing assignments of manufacturing components to loading docks) for each of those CAD Models. In some embodiments, the designs associated with multiple CAD models can be evaluated in parallel on, e.g., a cloud computing system or even the same computer. Further, the design application 130 can compare the high-performing designs for different CAD models to determine one or more designs that are highest-performing. For example, the high-performing designs for different CAD models can be compared based on travel distance, congestion, and number of turns, similar to the description above in conjunction with FIGS. 3 and 9.

In sum, techniques are disclosed for designing manufacturing facilities. In the disclosed techniques, a design application, such as a CAD application, imports a CAD model and metadata associated with a manufacturing facility to generate a data set that specifies geometric and manufacturing constraints associated with the manufacturing facility. The design application performs optimization operations based on the data set to identify one or more high-performing designs that assign manufacturing components to loading docks in the manufacturing facility. The optimization operations can include genetic optimization operations that generate multiple generations of designs, each of which is evaluated based on the travel distance, congestion, and number of turns associated with shortest paths traversed by manufacturing components for the design. A crossover operator suitable for discrete parameters and ordered lists, such as an order crossover, can be employed to generate the multiple generations of design. An optional heuristic optimization technique can be employed to generate a relatively high-performing design that is used to initialize the design of a first generation of the genetic optimization.

At least one technical advantage of the disclosed techniques relative to the prior art is that the disclosed techniques can be incorporated into a CAD application to enable the CAD application to automatically calculate travel distances within a manufacturing facility using shortest path computations that are more accurate than the travel distance approximations generated using conventional spreadsheets. In addition, when the disclosed techniques are incorporated into a CAD application, the CAD application also can automatically account for levels of congestion within a manufacturing facility during operation, which is a factor that usually cannot be considered when generating designs using conventional CAD software. With these enhanced functionalities, a CAD application can be used to more fully explore the overall design space when designing complex manufacturing facilities and plants. Among other things, the CAD application can generate a far larger number of different designs relative to prior art approaches, and the different designs can be analyzed and compared by the CAD application in parallel. Thus, with the disclosed techniques, the likelihood of generating and identifying an optimized design for a complex manufacturing facility or other structure is increased. These technical advantages represent tangible and meaningful technological improvements over conventional CAD applications.

1. In some embodiments, a computer-implemented method for designing a manufacturing facility comprises parsing a computer-aided design (CAD) model of the manufacturing facility to identify one or more geometric constraints associated with the manufacturing facility, parsing metadata associated with the manufacturing facility to identify one or more manufacturing constraints associated with the manufacturing facility, generating a first design for the manufacturing facility based on the one or more geometric constraints and the one or more manufacturing constraints, generating a second design for the manufacturing facility based on the one or more geometric constraints and the one or more manufacturing constraints, and performing one or more operations on the first design and the second design based on a crossover operator that operates on discrete parameters to generate a third design for the manufacturing facility.

2. The method of clause 1, wherein the crossover operator comprises an order crossover operator.

3. The method of clauses 1 or 2, wherein performing the one or more operations on the first design and the second design based on the crossover operator comprises copying one or more items from one or more continuous ranges in the first design to the third design, and copying, in a relative order, one or more items that are not included in the one or more continuous ranges in the first design from the second design to the third design.

4. The method of any of clauses 1-3, wherein the discrete parameters comprise a list of integers representing an ordering of loading docks in the manufacturing facility.

5. The method of any of clauses 1-4, wherein one or more manufacturing components are assigned to one or more different loading docks in each of the first design, the second design, and the third design.

6. The method of any of clauses 1-5, further comprising evaluating the third design based on at least one of a travel distance, a congestion level, or a number of turns associated with one or more paths traversed by one or more manufacturing components when in transit between one or more loading docks and one or more workstations in the manufacturing facility.

7. The method of any of clauses 1-6, wherein the third design is generated to satisfy the one or more geometric constraints and the one or more manufacturing constraints.

8. The method of any of clauses 1-7, wherein the CAD model and the metadata are parsed by executing one or more scripts, and the one or more scripts store the one or more geometric constraints and the one or more manufacturing constraints in a data set.

9. The method of any of clauses 1-8, further comprising performing one or more operations that modify the third design based on a mutation operator to generate a fourth design for the manufacturing facility.

10. The method of any of clauses 1-9, further comprising generating at least one other design for the manufacturing facility based on the one or more geometric constraints and the one or more manufacturing constraints, and selecting the first design and the second design based on values of an optimization objective associated with the first design, the second design, and the at least one other design.

11. In some embodiments, one or more non-transitory computer-readable storage media include instructions that, when executed by at least one processor, cause the at least one processor to performing steps for designing a manufacturing facility, the steps comprising parsing a computer-aided design (CAD) model of the manufacturing facility to identify one or more geometric constraints associated with the manufacturing facility, parsing metadata associated with the manufacturing facility to identify one or more manufacturing constraints associated with the manufacturing facility, generating a first design for the manufacturing facility based on the one or more geometric constraints and the one or more manufacturing constraints, generating a second design for the manufacturing facility based on the one or more geometric constraints and the one or more manufacturing constraints, and performing one or more operations on the first design and the second design based on a crossover operator that operates on discrete parameters to generate a third design for the manufacturing facility.

12. The one or more non-transitory computer-readable storage media of clause 11, wherein the crossover operator comprises an order crossover operator.

13. The one or more non-transitory computer-readable storage media of clauses 11 or 12, wherein performing the one or more operations on the first design and the second design based on the crossover operator comprises copying one or more items from one or more continuous ranges in the first design to the third design, and copying, in a relative order, one or more items that are not included in the one or more continuous ranges in the first design from the second design to the third design.

14. The one or more non-transitory computer-readable storage media of any of clauses 11-13, wherein the discrete parameters comprise a list of integers, strings, or objects representing an ordering of loading docks in the manufacturing facility.

15. The one or more non-transitory computer-readable storage media of any of clauses 11-14, wherein one or more manufacturing components are assigned to one or more different loading docks in each of the first design, the second design, and the third design.

16. The one or more non-transitory computer-readable storage media of any of clauses 11-15, further comprising evaluating the third design based on at least one of a travel distance, a congestion level, or a number of turns associated with one or more paths traversed by one or more manufacturing components when in transit between one or more loading docks and one or more workstations in the manufacturing facility.

17. The one or more non-transitory computer-readable storage media of any of clauses 11-16, wherein the third design is generated to satisfy the one or more geometric constraints and the one or more manufacturing constraints.

18. The one or more non-transitory computer-readable storage media of any of clauses 11-17, wherein the one or more geometric constraints comprises geometries associated with the one or more loading docks, one or more walls of the manufacturing facility, and one or more workstations in the manufacturing facility, and the one or more geometric constraints further comprises one or more areas within the manufacturing facility that are off limits and cannot be traversed.

19. The one or more non-transitory computer-readable storage media of any of clauses 11-18, wherein the one or more manufacturing constraints comprise a grouping of a plurality of manufacturing components that are unloaded from one or more vehicles at a first loading dock prior to being processing at one or more workstations in the manufacturing facility and loaded onto one or more vehicles at a second loading dock after being processed at the one or more workstations.

20. In some embodiments, a system comprises one or more memories storing instructions, and one or more processors that are coupled to the one or more memories and, when executing the instructions, are configured to parse a computer-aided design (CAD) model of the manufacturing facility to identify one or more geometric constraints associated with the manufacturing facility, parse metadata associated with the manufacturing facility to identify one or more manufacturing constraints associated with the manufacturing facility, generate a first design for the manufacturing facility based on the one or more geometric constraints and the one or more manufacturing constraints, generate a second design for the manufacturing facility based on the one or more geometric constraints and the one or more manufacturing constraints, and perform one or more operations on the first design and the second design based on a crossover operator that operates on discrete parameters to generate a third design for the manufacturing facility.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for designing a manufacturing facility, the method comprising:
   parsing a computer-aided design (CAD) model of the manufacturing facility to identify one or more geometric constraints associated with the manufacturing facility;
   parsing metadata associated with the manufacturing facility to identify one or more manufacturing constraints associated with the manufacturing facility that are subsequently used to generate at least one design for the manufacturing facility;
   generating a first design for the manufacturing facility based on the one or more geometric constraints and the one or more manufacturing constraints;
   generating a second design for the manufacturing facility based on the one or more geometric constraints and the one or more manufacturing constraints;
   performing one or more operations on the first design and the second design based on a crossover operator that operates on discrete parameters to generate a third design for the manufacturing facility; and
   automatically evaluating the third design based on at least one of a travel distance, a congestion level, or a number of turns associated with one or more paths traversed by one or more manufacturing components during transit between one or more loading docks and one or more workstations in the manufacturing facility.

2. The computer-implemented method of claim 1, wherein the crossover operator comprises an order crossover operator.

3. The computer-implemented method of claim 1, wherein the discrete parameters comprise a list of integers representing an ordering of loading docks in the manufacturing facility.

4. The computer-implemented method of claim 1, wherein one or more manufacturing components are assigned to one or more different loading docks in each of the first design, the second design, and the third design.

5. The computer-implemented method of claim 1, wherein the third design is generated to satisfy the one or more geometric constraints and the one or more manufacturing constraints.

6. The computer-implemented method of claim 1, wherein the CAD model and the metadata are parsed by executing one or more scripts, and the one or more scripts store the one or more geometric constraints and the one or more manufacturing constraints in a data set.

7. The computer-implemented method of claim 1, further comprising performing one or more operations that modify the third design based on a mutation operator to generate a fourth design for the manufacturing facility.

8. The computer-implemented method of claim 1, further comprising:
   generating at least one other design for the manufacturing facility based on the one or more geometric constraints and the one or more manufacturing constraints; and
   selecting the first design and the second design based on values of an optimization objective associated with the first design, the second design, and the at least one other design.

9. The computer-implemented method of claim 1, wherein copying one or more items from the one or more continuous ranges in the first design to the third design comprises copying a first plurality of items from a first continuous range of a first ordered list of items associated with the first design to the third design, wherein the relative positions of the first plurality of items in the first continuous range are not changed when copied to the third design.

10. The computer-implemented method of claim 1, wherein performing the one or more operations on the first design and the second design based on the crossover operator comprises:
    copying one or more items from one or more continuous ranges in the first design to the third design; and
    copying one or more items that are not included in the one or more continuous ranges in the first design from the second design to the third design.

11. One or more non-transitory computer-readable storage media including instructions that, when executed by at least one processor, cause the at least one processor to performing steps for designing a manufacturing facility, the steps comprising:
    parsing a computer-aided design (CAD) model of the manufacturing facility to identify one or more geometric constraints associated with the manufacturing facility;
    parsing metadata associated with the manufacturing facility to identify one or more manufacturing constraints associated with the manufacturing facility that are used to generate at least one design for the manufacturing facility;
    generating a first design for the manufacturing facility based on the one or more geometric constraints and the one or more manufacturing constraints;

generating a second design for the manufacturing facility based on the one or more geometric constraints and the one or more manufacturing constraints;

performing one or more operations on the first design and the second design based on a crossover operator that operates on discrete parameters to generate a third design for the manufacturing facility; and automatically evaluating the third design based on at least one of a travel distance, a congestion level, or a number of turns associated with one or more paths traversed by one or more manufacturing components during transit between one or more loading docks and one or more workstations in the manufacturing facility.

12. The one or more non-transitory computer-readable storage media of claim 11, wherein the crossover operator comprises an order crossover operator.

13. The one or more non-transitory computer-readable storage media of claim 11, wherein the discrete parameters comprise a list of integers, strings, or objects representing an ordering of loading docks in the manufacturing facility.

14. The one or more non-transitory computer-readable storage media of claim 11, wherein one or more manufacturing components are assigned to one or more different loading docks in each of the first design, the second design, and the third design.

15. The one or more non-transitory computer-readable storage media of claim 11, wherein the third design is generated to satisfy the one or more geometric constraints and the one or more manufacturing constraints.

16. The one or more non-transitory computer-readable storage media of claim 11, wherein the one or more geometric constraints comprises geometries associated with the one or more loading docks, one or more walls of the manufacturing facility, and one or more workstations in the manufacturing facility, and the one or more geometric constraints further comprises one or more areas within the manufacturing facility that are off limits and cannot be traversed.

17. The one or more non-transitory computer-readable storage media of claim 11, wherein the one or more manufacturing constraints comprise a grouping of a plurality of manufacturing components that are unloaded from one or more vehicles at a first loading dock prior to being processing at one or more workstations in the manufacturing facility and loaded onto one or more vehicles at a second loading dock after being processed at the one or more workstations.

18. A system comprising:
one or more memories storing instructions; and
one or more processors that are coupled to the one or more memories and, when executing the instructions, are configured to:
  parse a computer-aided design (CAD) model of a manufacturing facility to identify one or more geometric constraints associated with the manufacturing facility,
  parse metadata associated with the manufacturing facility to identify one or more manufacturing constraints associated with the manufacturing facility that are used to generate at least one design for the manufacturing facility,
  generate a first design for the manufacturing facility based on the one or more geometric constraints and the one or more manufacturing constraints,
  generate a second design for the manufacturing facility based on the one or more geometric constraints and the one or more manufacturing constraints,
  perform one or more operations on the first design and the second design based on a crossover operator that operates on discrete parameters to generate a third design for the manufacturing facility, and
  automatically evaluate the third design based on at least one of a travel distance, a congestion level, or a number of turns associated with one or more paths traversed by one or more manufacturing components during transit between one or more loading docks and one or more workstations in the manufacturing facility.

* * * * *